(12) United States Patent
Raszkowski (10) Patent No.: US 8,142,322 B2
(45) Date of Patent: Mar. 27, 2012

(54) TRANSMISSION WITH HYDRAULICALLY ACTUATED SPLINED CLUTCH

(75) Inventor: James A. Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 993 days.

(21) Appl. No.: 12/113,360

(22) Filed: May 1, 2008

(65) Prior Publication Data

US 2009/0272212 A1 Nov. 5, 2009

(51) Int. Cl.
*F16H 37/02* (2006.01)
*F16H 3/44* (2006.01)
*F16H 3/08* (2006.01)

(52) U.S. Cl. ............................ 475/207; 475/302; 74/331
(58) Field of Classification Search .................. 475/207, 475/218, 302
See application file for complete search history.

(56) References Cited

U.S. PATENT DOCUMENTS

| 5,823,051 A * | 10/1998 | Hall, III ........................... 74/325 |
| 7,070,534 B2 * | 7/2006 | Pelouch ......................... 475/214 |
| 2007/0234834 A1 * | 10/2007 | Gitt et al. ........................ 74/325 |
| 2008/0045373 A1 | 2/2008 | Rodgers II |
| 2008/0161154 A1 | 7/2008 | Bjorck et al. |

* cited by examiner

*Primary Examiner* — Edwin A Young
(74) *Attorney, Agent, or Firm* — Barnes & Thornburg LLP (57) ABSTRACT

A transmission includes an input member, an output member, and an intermediate member coaxially aligned with the input member and the output member. The transmission further includes at least one countershaft substantially parallel with the input member, output member and the intermediate member, and at least one gear associated with each of the input member, the output member, intermediate member, at least one countershaft. The transmission also includes a planetary gear set to operatively couple a gear of the at least one gear associated with the intermediate shaft with the output shaft, and a plurality of clutches to selectively define a torque transfer path from the input member to the output member via one or more of the intermediate member, first countershaft, second countershaft, and the at least one associated gears therewith. The plurality of clutches include a direct drive clutch to selectively couple the input member directly to the intermediate member.

20 Claims, 4 Drawing Sheets

TRANSMISSION WITH HYDRAULICALLY ACTUATED SPLINED CLUTCH

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. This concept typically uses countershaft gears with a different, dedicated gear pair to achieve each forward speed ratio and possibly a direct drive ratio. This necessitates a large number of gear pairs, especially in transmissions that have a relatively large number of forward speed ratios. Such transmissions tend have a relatively long length to accommodate the large number of gear pairs which adds weight and cost.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DESCRIPTION OF THE PREFERRED EMBODIMENT

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
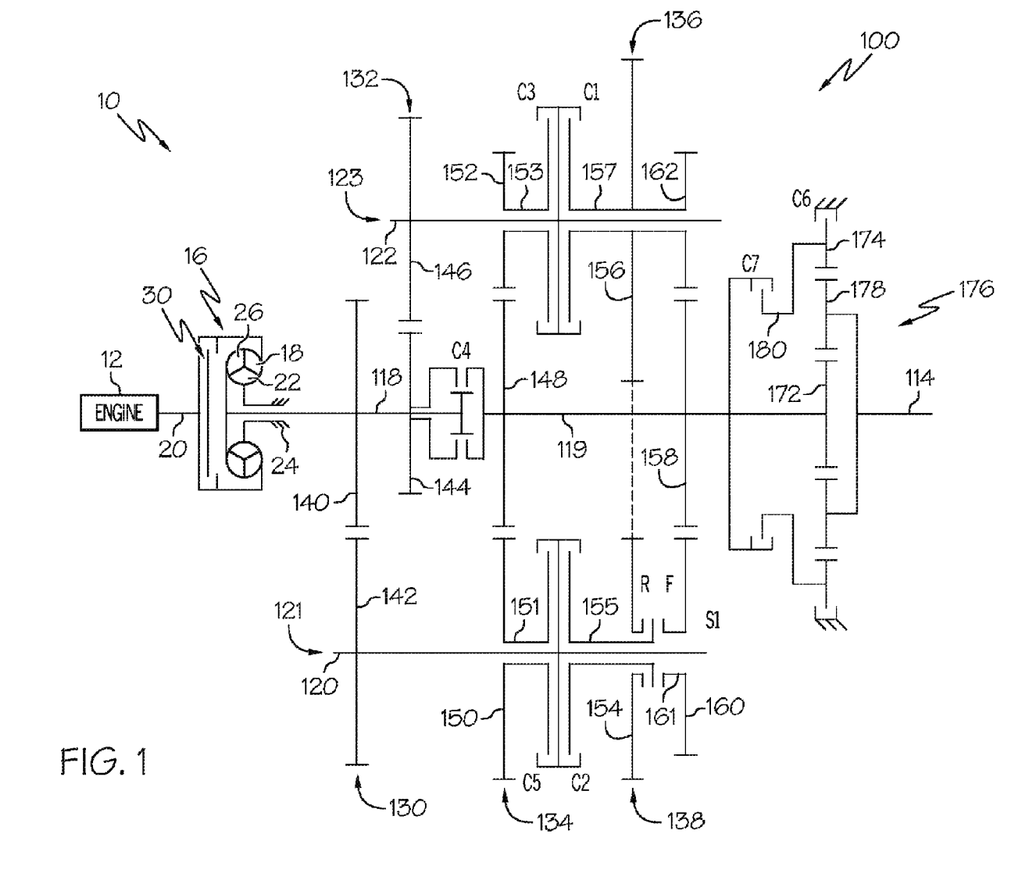
FIG. 1 shows an embodiment of a powertrain having a transmission with an output splitter.

Referring now to FIG. 1, a stick diagram presents a schematic layout of an embodiment of a powertrain 10 comprising a multi-speed transmission 100 and output splitter 101 for use in a motor vehicle. The powertrain 10 includes an engine 12 operatively connected to the transmission 100 through a torque converter 16. The torque converter 16 includes a pump portion 18 connected for rotation with an engine shaft 20, a stator portion 22 grounded to a stationary member such as the transmission housing or casing 24, and a turbine portion 26. The torque converter 16 provides fluid coupling and torque multiplication between the pump portion 18 and the turbine portion 26. The turbine portion 26 is connected for rotation with an input member 118 of the transmission 100. The torque converter 16 includes a lock-up clutch 30. When the lock-up clutch 30 is engaged, power flow from the engine shaft 20 is directly connected with the input member 118, bypassing the fluid coupling and torque multiplication of the pump portion 18 and turbine portion 26.

As shown, the transmission 100 includes an output shaft or member 114 and an input shaft or member 118. Those skilled in the art will appreciate that the output and input members 114, 118 may be components other than shafts without departing from the scope of the present invention. The output member 114 is continuously connected with a final drive unit or transfer case (not shown) in the motor vehicle. The input member 118 is continuously connected to a turbine of a torque converter 16.

The transmission 100 further includes an intermediate or interconnecting member 119, a first layshaft or countershaft 120, and a second layshaft or countershaft 122. The intermediate member 119 is concentric with and selectively connected the input member 118 via a direct drive clutch C4 for common rotation with the input member 118. The countershafts 120, 122 are each be spaced radially outward from and parallel with the input member 118, the output member 114, and intermediate member 119.

The countershafts 120, 122 form part of a pair of countershaft gearing arrangements 121, 123 that also include a plurality of co-planar gear sets including a first gear set 130, a second gear set 132, a third gear set 134, a fourth gear set 136, and a fifth gear set 138. More specifically, the first countershaft gearing arrangement 121 includes the first countershaft 120, the first gear set 130, the third gear set 134, the fourth gear set 136, and the fifth gear set 138. The second countershaft gearing arrangement 123 includes the second countershaft 122, the second gear set 132, the third gear set 134, the fourth gear set 136, and also the fifth gear set 138.

The first gear set 130 includes a gear 140 and a gear 142. Gear 140 is connected for common rotation with the input member 118 and continuously intermeshed with gear 142. Gear 142 is connected for common rotation with the first countershaft 120.

The second gear set 132 includes a gear 144 and a gear 146. Gear 144 is connected for common rotation with the input member 118 and is continuously intermeshed with gear 146. Gear 146 is connected for common rotation with the second countershaft 122.

The third gear set 134 includes a gear 148, gear 150 and a gear 152. Gear 148 is connected for common rotation with the intermediate member 119 and is continuously intermeshed with gear 150 and gear 152. Gear 150 is connected to a sleeve member 151 that is rotatable about and selectively connectable with the first countershaft 120. Gear 152 is connected to a sleeve member 153 that is rotatable about and selectively connectable with the second countershaft 122.

The fourth gear set 136 includes a gear 154 and a gear 156. Gear 154 is connected to a sleeve member 155 that is rotatable about and selectively connectable with the first countershaft 120. Gear 156 is connected to a sleeve member 157 that is rotatable about and selectively connectable with the second countershaft 122. It should be understood that the intermediate member 119 and the countershafts 120, 122 are in different planes, in a triangular formation so that gear 154 is continuously intermeshed with gear 156 without interfering with intermediate member 119. This is shown in FIG. 1 with a portion of gear 154 in phantom to indicate that it is behind intermediate member 119.

The fifth gear set 138 includes a gear 158, a gear 160, and a gear 162. Gear 158 is connected for common rotation with the intermediate member 119 and is continuously intermeshed with gear 160 and gear 162. Gear 160 is connected to sleeve member 161 that is rotatable about and selectively connectable with the first countershaft 120. The gear 162 is connected to the sleeve member 157 that is rotatable about and selectively connectable with the second countershaft 122.

The transmission 100 further includes a high/low output splitter gear set 170 located between the intermediate member 119 and the output member 114. The output splitter gear set 170 in one embodiment includes a simple planetary gear set having a sun gear member 172, a ring gear member 174, and a planet carrier member 176 which rotatably supports a set of pinion gears 178 which are continuously intermeshed with both the sun gear member 172 and the ring gear member 174. The sun gear member 172 is connected for common rotation with the intermediate member 119. The ring gear member 174 is connected for common rotation with a third intermediate member 180. The planet carrier member 176 is connected for common rotation with the output member 114.

The transmission 100 further includes plurality of torque-transmitting mechanisms such as clutches C1, C2, C3, C4, C5, C6, C7 and synchronizer S1. The first clutch C1 is selectively engageable to connect gear 156 of the fourth gear set 136 and gear 162 of the fifth gear set 138 with the second countershaft 122. The second clutch C2 is selectively engageable to connect the sleeve member 155 with the first countershaft 120. The first and second clutches C1, C2 in one embodiment are radially aligned with one another and radially offset from the intermediate member 119. However, it should be appreciated that the clutches C1, C2 may be in various other positions relative to one another without departing from the scope of the present invention.

The third clutch C3 is selectively engageable to connect gear 152 of the third gear set 134 with the second countershaft 122. The fifth clutch C5 is selectively engageable to connect gear 150 of the third gear set 134 with the first countershaft 120. The third and fifth clutches C3, C5 in one embodiment are radially aligned with one another and radially offset from the intermediate member 119. However, it should be appreciated that the clutches C3, C5 may be in various other positions relative to one another without departing from the scope of the present invention.

As shown, the transmission 100 also includes a clutch C7, and a brake C6 to allow for selective interconnection of the intermediate member 119 to the output member 114. For example, the clutch C7 is selectively engageable to connect the intermediate member 119 with an output member 180. The brake C6 is selectively engageable to connect the ring gear member 174 with a ground or the transmission housing 24 in order to restrict the ring gear member 174 from rotating relative to the ground or transmission housing 24. The clutch C7 and the brake C6 in one embodiment include hydraulically actuated friction clutches.

The transmission 100 further includes a synchronizer S1 for selective interconnection of the gear 154 and gear 160 with the sleeve member 155. The synchronizer S1 generally includes a shift fork (not shown) that is bi-directionally translated by an actuator (not shown). For example, the synchronizer S1 may be translated to the left (position R in FIG. 1) to synchronize the speed of the sleeve member 155 with the speed of gear 154 and couple it thereto or moved to the right (position F in FIG. 1) to synchronize the speed of the sleeve member 155 with the speed of gear 160 and couple it thereto.

The transmission 210 also includes a direct drive clutch C4 for selectively coupling the input member 118 to the intermediate member 119. As explained in more detail below in regard to FIG. 3, the direct drive clutch C4 includes a splined sleeve that may be hydraulically actuated to couple the input member 118 to the intermediate member 119 for common rotation. Thus, engagement of the direct drive clutch C4 results in the input member 118 directly driving the intermediate shaft 119 via the input shaft 118.

Referring now to FIG. 1 and below TABLE 1, the operation of the embodiment of the transmission 100 will be described. It will be appreciated that the transmission 100 is capable of transmitting torque from the input member 118 to the output member 114 in at least ten forward speed or torque ratios and at least two reverse speed or torque ratios. Each forward and reverse speed or torque ratio is attained by engagement of one or more of the torque-transmitting mechanisms (i.e. synchronizer S1, clutches C1, C2, C3, C4, C5, C6, C7) as will be explained below. TABLE 1 presents the various combinations of torque-transmitting mechanisms that are activated or engaged to achieve the various gear states. In the particular, "R" and "F" refer to the positions of the synchronizer S1 as described above and illustrated in FIG. 1. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in TABLE 1. Of course, other gear ratios are achievable depending on the gear diameter, gear teeth count and gear configuration selected.

To establish reverse gear low REV L, the second clutch C2 and the brake C6 are engaged or activated and the synchronizer S1 is placed in the R position. The second clutch C2 connects the sleeve member 155 with the first countershaft 120. The brake C6 connects the ring gear member 174 with the ground or transmission housing 24. The synchronizer S1 synchronizes gear 154 with the sleeve member 155. As a result, engine torque is transferred to the first countershaft 120 via the first gear set 130, which in turn transfers torque to the fourth gear set 154 via the clutch C2 engaging sleeve member 155. The torque of the fourth gear set 136 is thus transferred to the fifth gear set 162 via sleeve member 157 and the intermediate member 119 via gear 158 of the fifth gear set. Engagement of the brake C6, prevents rotation of ring gear 174 so torque transferred to sun gear 172 from intermediate member 119 is multiplied to the output 114 by the planet carrier member 176 and its pinion gears 178.

Similarly, to establish gear 9 associated with a direct drive between the engine 12 and the output member 114, the direct drive clutch C4 is actuated to engage the intermediate member 119 with the input member 118, thus transferring engine torque from the input member 118 to the gear 172. Further, engagement of C7 clutch, locks the carrier 176 and the output member 114 to the sun gear 172 and the intermediate member 119.

Likewise, the reverse gear high and the other nine forward ratios are achieved through different combinations of clutch and brake engagement and synchronizer position, as shown in TABLE 1.

TABLE 1

| Gear | Torque Ratio | Ratio Step | C1 | C2 | C3 | C4 | C5 | C6 | C7 | F | R |
|---|---|---|---|---|---|---|---|---|---|---|---|
| Rev L | 7.42 | | | X | | | | X | | | X |
| Rev H | 2.16 | | | X | | | | | X | | X |
| 1 | 7.49 | | X | | d | | | X | | | |
| 2 | 5.51 | 1.36 | | X | | | | X | | X | |
| 3 | 4.03 | 1.36 | | | X | | | X | | | |
| 4 | 3.43 | 1.18 | | | | X | | X | | | |
| 5 | 2.97 | 1.16 | | | | | X | X | | | |
| 6 | 2.18 | 1.36 | X | | | | | | X | | |

TABLE 1-continued

| Gear | Torque Ratio | Ratio Step | C1 | C2 | C3 | C4 | C5 | C6 | C7 | F | R |
|------|--------------|------------|----|----|----|----|----|----|----|---|---|
| 7 | 1.61 | 1.36 | X |  |  |  |  |  | X | X |  |
| 8 | 1.18 | 1.36 |  | X |  |  |  |  | X |  |  |
| 9 | 1.00 | 1.18 |  |  |  | X |  |  | X |  |  |
| 10 | 0.87 | 1.16 |  |  |  |  |  | X | X |  |  |

Figure 2:
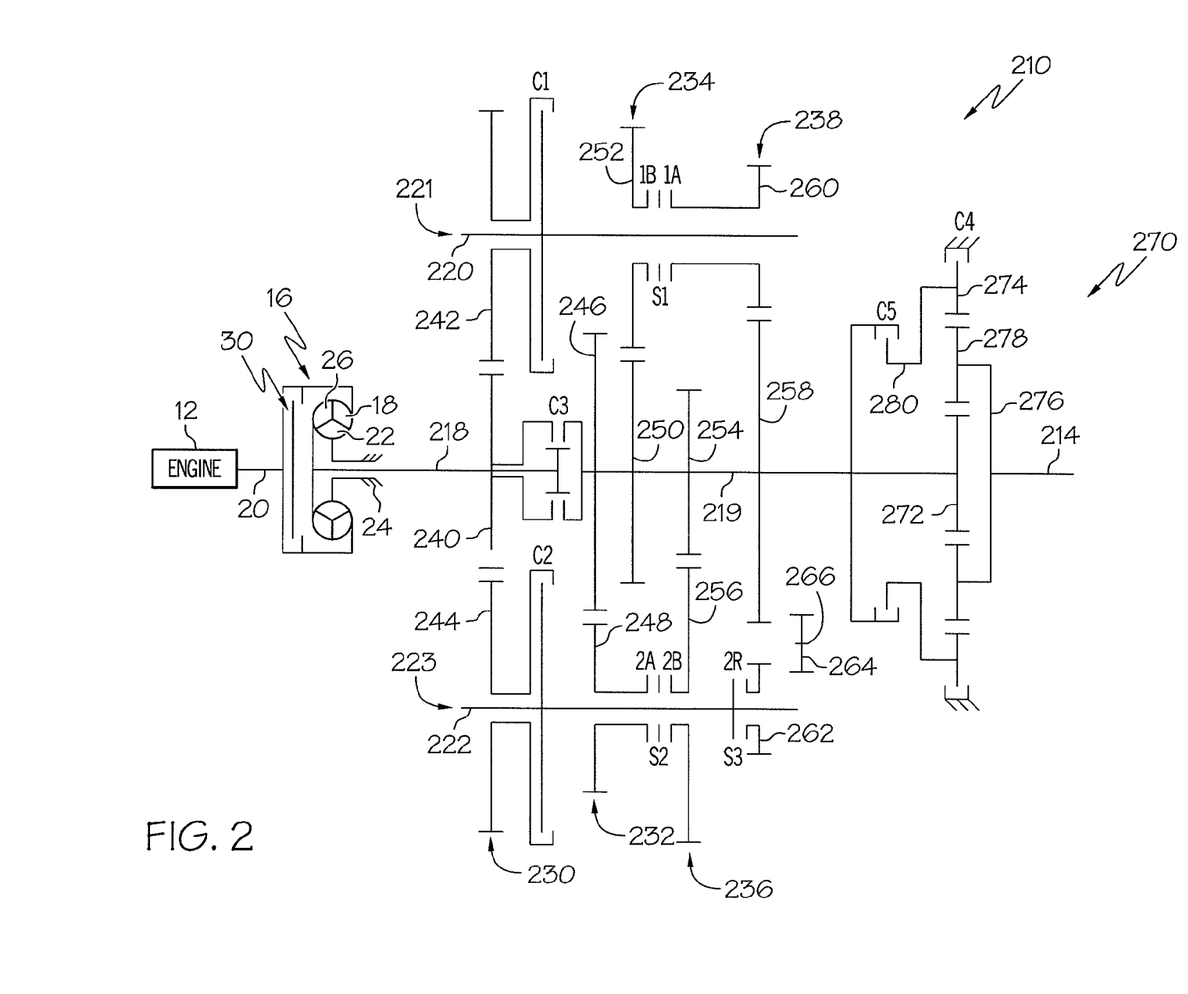
FIG. 2 shows another embodiment of a powertrain having a transmission with an output splitter.

With reference to FIG. 2, a stick diagram presents a schematic layout of another multi-speed transmission for use in a motor vehicle, generally indicated by reference number 210. The transmission 210 is preferably a longitudinal dual clutch transmission (DCT) with a splitter output section. The transmission 210 includes an output shaft or member 214 and an input shaft or member 218. Those skilled in the art will appreciate that the input and output members 218, 214 may be components other than shafts without departing from the scope of the present invention. The input member 218 is continuously connected to a turbine of a torque converter 16. The output member 214 is continuously connected with a final drive unit or transfer case (not shown) in the motor vehicle.

The transmission 210 further includes an intermediate shaft, countershafts, co-planar intermeshing gear sets, and selectively engagable synchronizers and clutches as will be described herein. For example, the transmission 210 includes an intermediate or interconnecting member 219, a first layshaft or countershaft 220, and a second layshaft or countershaft 222. The intermediate member 219 is concentric with the input member 218. The countershafts 220, 222 are both spaced radially outward from and parallel with the input member 218, the output member 214, and the intermediate member 219.

The countershafts 220, 222 form part of a pair of countershaft gearing arrangements 221, 223 that also include a plurality of co-planar gear sets including a first gear set 230, a second gear set 232, a third gear set 234, a fourth gear set 236, and a fifth gear set 238. More specifically, the first countershaft gearing arrangement 221 includes the first countershaft 220, the first gear set 230, the third gear set 234, and the fifth gear set 238. The second countershaft gearing arrangement 223 includes the second countershaft 222, the first gear set 230, the second gear set 232, the fourth gear set 236, and also the fifth gear set 238.

The first gear set 230 includes a gear 240, a gear 242, and a gear 244. Gear 240 is connected for common rotation with the input member 218 and intermeshed with gear 242 and gear 244. Gear 242 is rotatable about and selectively connectable with the first countershaft 220. Gear 244 is rotatable about and selectively connectable with the second countershaft 222.

The second gear set 232 includes a gear 246 and a gear 248. Gear 246 is connected for common rotation with the intermediate member 219 and is intermeshed with gear 248. Gear 248 is rotatable about and selectively connectable with the second countershaft 222.

The third gear set 234 includes a gear 250 and a gear 252. Gear 250 is connected for common rotation with the intermediate member 219 and is intermeshed with gear 252. Gear 252 is rotatable about and selectively connectable with the first countershaft 220.

The fourth gear set 236 includes a gear 254 and a gear 256. Gear 254 is connected for common rotation with the intermediate member 219 and is intermeshed with gear 256. Gear 256 is rotatable about and selectively connectable with the second countershaft 222.

The fifth gear set 238 includes a gear 258, a gear 260, a gear 262, and gear 264. Gear 258 is connected for common rotation with the intermediate member 219 and is intermeshed with gear 260 and an idler gear 264. Gear 260 is rotatable about and selectively connectable with the first countershaft 220. The idler gear 264 is connected for common rotation with an independent shaft or pinion 266. The idler gear 264 is intermeshed with gear 262. Gear 262 is rotatable about and selectively connectable with the second countershaft 222.

The transmission further includes a high/low splitter gear set 270 located between the intermediate member 219 and the output member 214. The splitter gear set 270 is preferably a simple planetary gear set having a sun gear member 272, a ring gear member 274, and a planet carrier member 276 which rotatably supports a set of pinion gears 278 which intermesh with both the sun gear member 272 and the ring gear member 274. The sun gear member 272 is connected for common rotation with the intermediate member 219. The ring gear member 274 is connected for common rotation with output member 280. The planet carrier member 276 is connected for common rotation with the output member 214.

The transmission 210 further includes a dual clutch arrangement for selectively coupling the input member 218 to one of the first and second countershafts 220, 222. More specifically, the dual clutch arrangement includes a first clutch C1 and a second clutch C2. The first clutch C1 is selectively engageable to connect gear 242 of the first gear set 230 with the first countershaft 220. The second clutch C2 is selectively engageable to connect gear 244 of the first gear set 230 with the second countershaft 222. The first and second clutches C1, C2 are preferably radially aligned with one another and radially offset from the input member 218. However, it should be appreciated that the clutches C1, C2 may be in various other positions relative to one another without departing from the scope of the present invention.

A plurality of torque-transmitting mechanisms including a first synchronizer S1, a second synchronizer S2, and a third synchronizer S3 allow for selective interconnection of the gears 248, 252, 256, 260, 262 with the countershafts 220, 222. The synchronizers S1, S2, S3 generally include a shift fork (not shown) that is bi-directionally translated by an actuator (not shown). For example, the first synchronizer S1 may be translated to the left (position 1B in FIG. 2) to synchronize the speed of the first countershaft 220 with the speed of gear 252 and couple it thereto or moved to the right (position 1A in FIG. 2) to synchronize the speed of the first countershaft 220 with the speed of gear 260 and couple it thereto. The second synchronizer S2 may be translated to the left (position 2A in FIG. 2) to synchronize the speed of the second countershaft 222 with the speed of gear 248 and couple it thereto or moved to the right (position 2B in FIG. 2) to synchronize the speed of the second countershaft 222 with the speed of gear 256 and couple it thereto. The third synchronizer S3 may be translated to the right (position 2R in FIG. 2) to synchronize the speed of the second countershaft 222 with the speed of gear 262 and couple it thereto.

The transmission 210 also includes a direct drive clutch C3 for selectively coupling the input member 218 to the intermediate member 219. As explained in more detail below in regard to FIGS. 3-4, the direct drive clutch C3 includes a splined sleeve that may be hydraulically actuated to couple the input member 218 to the intermediate member 219 for common rotation with the input member 218. Thus, engagement of the direct drive clutch C3 results in the input member 218 directly driving the intermediate shaft 219.

A plurality of torque-transmitting mechanisms including a fourth clutch C4, and a first brake C5 allow for selective interconnection of the intermediate member 219 to the output member 214. For example, the fourth clutch C4 is selectively engageable to connect the intermediate member 219 with the output member 280. The first brake C5 is selectively engageable to connect the ring gear member 274 with a ground or the transmission housing 24 in order to restrict the ring gear member 274 from rotating relative to the ground or transmission housing 24. The fourth clutch C4 and the brake C5 in one embodiment include hydraulically actuated friction clutches.

Referring now to FIG. 2 and TABLE 2, the operation of the embodiment of the transmission 210 will be described. It will be appreciated that the transmission 210 is capable of transmitting torque from the input member 218 to the output member 214 in at least ten forward speed or torque ratios and at least two reverse speed or torque ratios. Each forward and reverse speed or torque ratio is attained by engagement of one or more of the torque-transmitting mechanisms (i.e. first synchronizer S1, second synchronizer S2, third synchronizer S3, first clutch C1, second clutch C2, third clutch C3, fourth clutch C4, and first brake C5, as will be explained below. TABLE 2 presents the various combinations of torque-transmitting mechanisms that are activated or engaged to achieve the various gear states. In the particular, "1A", "1B", "2A", "2B", and "2R" refer to the positions of the synchronizers S1, S2, S3 as described above and illustrated in FIG. 2. Actual numerical gear ratios of the various gear states are also presented although it should be appreciated that these numerical values are exemplary only and that they may be adjusted over significant ranges to accommodate various applications and operational criteria of the transmission 210. An example of the gear ratios that may be obtained using the embodiments of the present invention are also shown in TABLE 2. Of course, other gear ratios are achievable depending on the gear diameter, gear teeth count and gear configuration selected.

To establish reverse gear low REV L, the second clutch C2 and the first brake C5 are engaged or activated and the third synchronizer S3 is placed in the 2R position. The second clutch C2 connects gear 244 with the second countershaft 222. The first brake C5 connects the ring gear member 274 with the ground or transmission housing 24. The third synchronizer S3 synchronizes gear 262 with the second countershaft 222. Similarly, to establish gear 9 associated with a direct drive between the engine 12 and the output member 214, the direct drive clutch C3 is actuated to engage the intermediate member 219 with the input member 218 and rotate the gear 272 in common with the input member 218. Further, the C4 clutch is engaged to connect the ring gear 274 with sun gear 272, thus locking and rotating in common the planet carrier member 276 and output member 214 to the gear 272.

Likewise, the reverse gear high and the other nine forward ratios are achieved through different combinations of clutch and brake engagement and synchronizer position, as shown in TABLE 2.

TABLE 2

| Gear | Torque Ratio | Ratio Step | C1 | C2 | C3 | C4 | C5 | 1A | 1B | 2A | 2B | 2R |
|---|---|---|---|---|---|---|---|---|---|---|---|---|
| Rev L | 8.68 | | | X | | | X | | | | | X |
| Rev H | 2.53 | | | X | X | | | | | | | X |
| 1 | 7.40 | | X | | | | X | X | | | | |
| 2 | 5.44 | 1.36 | | X | | | X | | | X | | |
| 3 | 4.00 | 1.36 | X | | | | X | | X | | | |
| 4 | 3.43 | 1.17 | | | X | | X | | | | | |
| 5 | 2.94 | 1.17 | | X | | | X | | | | X | |
| 6 | 2.16 | 1.36 | X | | X | | X | | | | | |
| 7 | 1.59 | 1.36 | | X | | X | | | | X | | |
| 8 | 1.17 | 1.36 | X | | | X | | X | | | | |
| 9 | 1.00 | 1.17 | | | X | X | | | | | | |
| 10 | 0.86 | 1.17 | | X | | X | | | | | X | |

Figure 3:
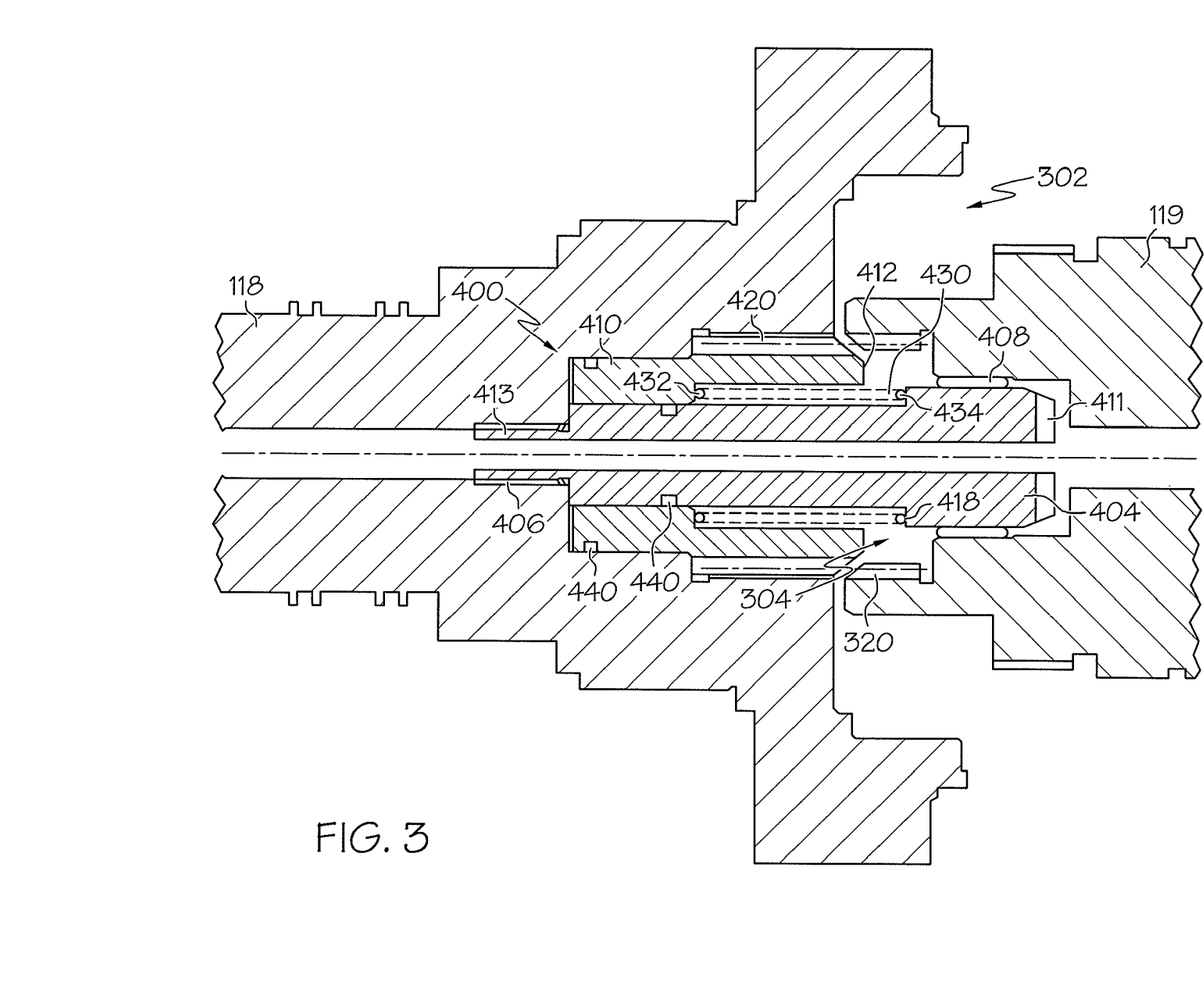
FIGS. 3-4 respectively show details of an embodiment of a sleeved clutch in an disengaged and engaged position.
Figure 4:
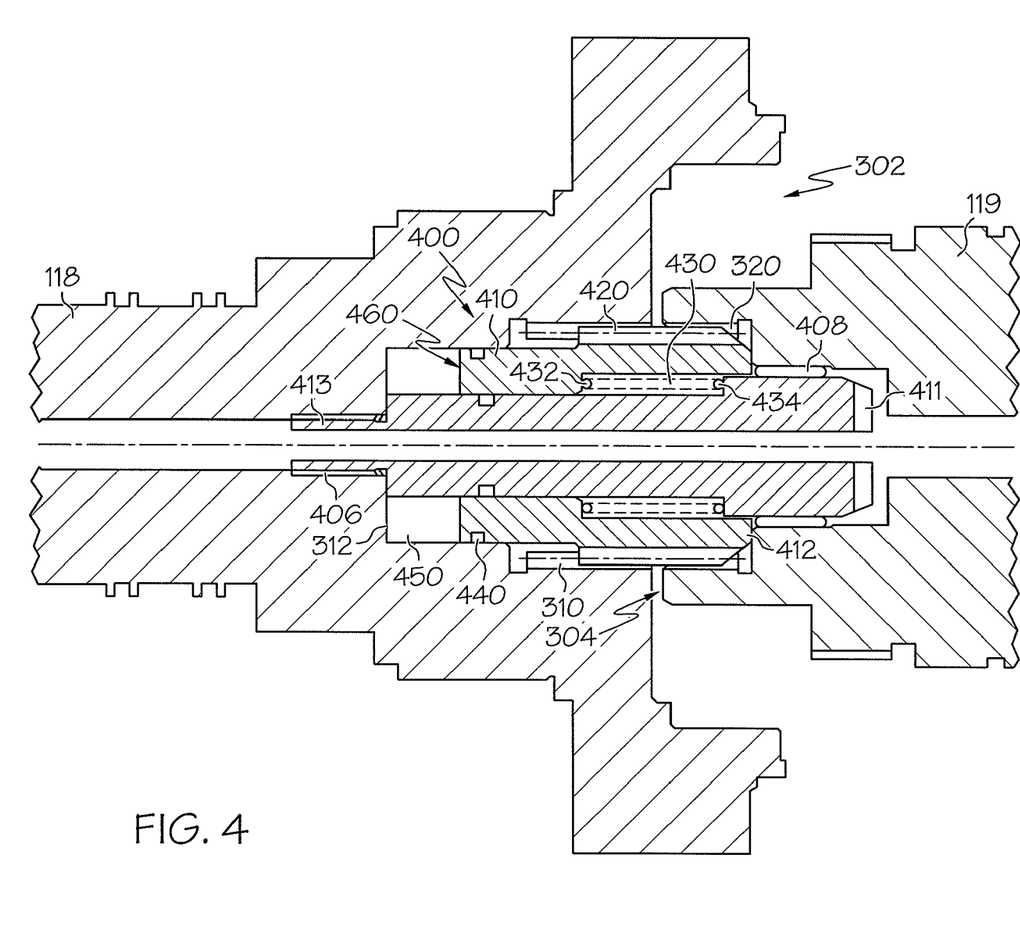

Referring now to FIGS. 3 and 4, a splined sleeve clutch embodiment 400 of the direct drive clutch C4 of FIG. 1 and the direct drive clutch C3 of FIG. 2 is shown. In particular, FIG. 3 depicts the splined sleeve clutch 400 in a disengaged position and FIG. 4 depicts the splined sleeve clutch 400 in an engaged position. To simplify the following description, the splined sleeve clutch 400 is described in relation to the transmission 100 of FIG. 1; however, it should be appreciated that the following description is also applicable to the transmission 210 of FIG. 2.

As shown, the clutch 400 is positioned within a concave head portion 302 of the input member 118 and a concave head portion 304 of the intermediate member 119. In particular, the clutch 400 includes a shaft 404 that is inserted coaxially into the concave head portion 302 of the input member 118 and the concave head portion 304 of the intermediate member 119. In one embodiment, a base end 413 of the shaft 404 is fixedly attached to the input member 118 via threads 406 and a distal end 411 is rotatably engaged with the intermediate member 119 via bushing 408.

As shown, the clutch 400 further includes a sleeve 410 that is slidably positioned on the shaft 404. The sleeve 410 includes a plurality of longitudinal splines 420 that engage or mate with splines 310 of the input member 118 and splines 320 of the intermediate member 119. The clutch 400 further includes a disengagement spring 430 positioned coaxilly about the shaft 404 such that one end 432 is seated in a concave head end 412 of the sleeve 410 and another end 434 of the spring 430 is seated against a step 418 toward a distal end 411 of the shaft 404. The spring 430 biases the sleeve 410 to a disengaged position away from the intermediate member 119 as shown in FIG. 3.

The clutch 400 also includes one or more seals 440 that create a hydraulic seal between the sleeve 410 and the input member 118 and the coaxial shaft 404. In one embodiment, the sleeve 410 is hydraulically actuated. Specifically, referring to FIG. 4, fluid is forced into chamber 450 between a base end 312 of the head portion 302 and a base end 460 of the sleeve 410 which causes the sleeve 410 to overcome the biasing force of the spring 430 and to slide away from the base end 312 and toward the intermediate member 119. As a result of sliding toward the intermediate member 119, the splines 420 of the sleeve 410 engage splines 320 of the intermediate member 119 while maintaining engagement with the splines 310 of the input member 118. Accordingly, the sleeve 410 effectively couples the input member 118 and intermediate member 119 together such that the intermediate member 119 rotates in common with the input member 118. Conversely, removing or reducing the force of the fluid into chamber 450 results in the spring 430 sliding the sleeve 410 toward the base end 312 of the head portion 302 thus disengaging the splines 420 of the sleeve 410 from the splines 320 of the intermediate member 119 as shown in FIG. 3. As a result, the intermediate member 119 may rotate separately from the input member 118 when the clutch 400 is disengaged.

In one embodiment, transmission range clutches C1-C7, along with speed sensors may be used to synchronize the speed of the shafts 118, 119 sufficiently to allow engagement of the sleeve 410 without interrupting torque from the engine 12. Disengagement, however, in one embodiment, uses engine torque control (i.e. power interruption) to release torque on splines 420 of the sleeve 420 so that the disengagement spring 430 can disengage the sleeve 420.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A transmission comprising:
   an input member to receive torque,
   an output member to output torque based upon the received torque of the input member,
   an intermediate member coaxially aligned with the input member and the output member;
   a first countershaft substantially parallel with the input member, output member and the intermediate member;
   a second countershaft substantially parallel with the input member, output member and the intermediate member;
   a plurality of gears comprising at least one gear associated with each of the input member, the output member, intermediate member, first countershaft, and second countershaft;
   a planetary gear set to operatively couple a gear associated with the intermediate member with the output member; and
   a plurality of torque-transmitting mechanisms to selectively define a torque transfer path from the input member to the output member via one or more of the intermediate member, first countershaft, second countershaft, and gears of the plurality of gears, wherein the plurality of torque-transmitting mechanisms include a direct drive clutch to selectively couple the input member directly to the intermediate member.

2. The transmission of claim 1, wherein
   the input member comprises a plurality of splines,
   the intermediate member comprises a plurality of splines, and
   the direct drive clutch comprises a sleeve comprising a plurality of splines, wherein the plurality of splines of the sleeve intermesh with only the plurality of splines of the input member at a first position and engage with the plurality of splines of both the input member and the intermediate member at a second position.

3. The transmission of claim 1, wherein
   the input member comprises a plurality of splines,
   the intermediate member comprises a plurality of splines, and
   the direct drive clutch comprises a shaft and a sleeve slidably mounted to the shaft, the sleeve comprising a plurality of splines intermeshed with the plurality of splines of the input member when at a first position on the shaft and intermeshed with the plurality of splines of both the input member and the intermediate member at a second position.

4. The transmission of claim 1, wherein
   the input member comprises a plurality of splines,
   the intermediate member comprises a plurality of splines, and
   the direct drive clutch comprises a shaft, a sleeve slidably mounted to the shaft, and a spring to bias the sleeve in a disengaged position along the shaft in which a plurality of splines of the sleeve intermesh with the plurality of splines of the input member but not the intermediate member, the sleeve hydraulically actuatable to an engaged position along the shaft in which the plurality of splines of the sleeve intermeshed with the plurality of splines of both the input member and the intermediate member.

5. The transmission of claim 1, wherein
   the input member comprises a concave end having a plurality of splines,
   the intermediate member comprises a concave end having a plurality of splines, and
   the direct drive clutch comprises a shaft having a base attached to the concave end of the input member and a distal end that extends into the concave end of the intermediate member, a sleeve slidable along the shaft, a spring to bias the sleeve toward the concave end of the input member, the sleeve comprising a plurality of splines intermeshed with the plurality of splines of the input member and a base end against which hydraulic fluid selectively forces the sleeve toward the concave end of the intermediate member to intermesh the plurality of splines of the intermediate member.

6. The transmission of claim 1, wherein the plurality of torque-transmitting mechanisms comprise a plurality of clutches.

7. The transmission of claim 6, wherein the plurality of torque-transmitting mechanisms further comprises at least one synchronizer.

8. A transmission comprising:
   an input member, an output member, and an intermediate member coaxially aligned with the input member and the output member;
   at least one countershaft substantially parallel with the input member, output member and the intermediate member;
   at least one gear associated with each of the input member, the output member, intermediate member, and at least one countershaft;
   a planetary gear set to operatively couple a gear of the at least one gear associated with the intermediate member with the output member; and
   a plurality of clutches to selectively define a torque transfer path from the input member to the output member via one or more of the intermediate member, first countershaft, second countershaft, and the at least one associated gears therewith, wherein the plurality of clutches include a direct drive clutch to selectively couple the input member directly to the intermediate member.

9. The transmission of claim 8, wherein
   the input member comprises a plurality of splines,
   the intermediate member comprises a plurality of splines, and
   the direct drive clutch comprises a sleeve comprising a plurality of splines, wherein the plurality of splines of the sleeve intermesh with only the plurality of splines of the input member at a first position and engage with the plurality of splines of both the input member and the intermediate member at a second position.

10. The transmission of claim 8, wherein
    the input member comprises a plurality of splines,
    the intermediate member comprises a plurality of splines, and
    the direct drive clutch comprises a shaft and a sleeve slidably mounted to the shaft, the sleeve comprising a plurality of splines intermeshed with the plurality of splines of the input member when at a first position on the shaft and intermeshed with the plurality of splines of both the input member and the intermediate member at a second position.

11. The transmission of claim 8, wherein
the input member comprises a plurality of splines,
the intermediate member comprises a plurality of splines, and
the direct drive clutch comprises a shaft, a sleeve slidably mounted to the shaft, and a spring to bias the sleeve in a disengaged position along the shaft in which a plurality of splines of the sleeve intermesh with the plurality of splines of the input member but not the intermediate member, the sleeve hydraulically actuatable to an engaged position along the shaft in which the plurality of splines of the sleeve intermeshed with the plurality of splines of both the input member and the intermediate member.

12. The transmission of claim 8, wherein
the input member comprises a concave end having a plurality of splines,
the intermediate member comprises a concave end having a plurality of splines, and
the direct drive clutch comprises a shaft having a base attached to the concave end of the input member and a distal end that extends into the concave end of the intermediate member, a sleeve slidable along the shaft, a spring to bias the sleeve toward the concave end of the input member, the sleeve comprising a plurality of splines intermeshed with the plurality of splines of the input member and a base end against which hydraulic fluid selectively forces the sleeve toward the concave end of the intermediate member to intermesh the plurality of splines of the intermediate member.

13. The transmission of claim 8, further comprising one or more synchronizers to selectively define the torque transfer path from the input member to the output member.

14. A transmission comprising:
an input member to receive torque,
an output member to output torque based upon the received torque of the input member,
an intermediate member coaxially aligned with the input member and the output member;
a plurality of countershafts each substantially parallel with the input member, output member and the intermediate member;
a plurality of gears comprising at least one gear associated with each of the input member, the output member, intermediate member, and each countershaft of the plurality of countershafts; and
a direct drive clutch to selectively couple the input member directly to the intermediate member.

15. The transmission of claim 14, wherein the direct drive clutch is one of a plurality of clutches to selectively define a torque transfer path from the input member to the output member via one or more of the intermediate member, the plurality of countershafts, and the plurality of gears.

16. The transmission of claim 14, wherein
the input member comprises a plurality of splines,
the intermediate member comprises a plurality of splines, and
the direct drive clutch comprises a sleeve comprising a plurality of splines, wherein the plurality of splines of the sleeve intermesh with only the plurality of splines of the input member at a first position and engage with the plurality of splines of both the input member and the intermediate member at a second position.

17. The transmission of claim 14, wherein
the input member comprises a plurality of splines,
the intermediate member comprises a plurality of splines, and
the direct drive clutch comprises a shaft and a sleeve slidably mounted to the shaft, the sleeve comprising a plurality of splines intermeshed with the plurality of splines of the input member when at a first position on the shaft and intermeshed with the plurality of splines of both the input member and the intermediate member at a second position.

18. The transmission of claim 14, wherein
the input member comprises a plurality of splines,
the intermediate member comprises a plurality of splines, and
the direct drive clutch comprises a shaft, a sleeve slidably mounted to the shaft, and a spring to bias the sleeve in a disengaged position along the shaft in which a plurality of splines of the sleeve intermesh with the plurality of splines of the input member but not the intermediate member, the sleeve hydraulically actuatable to an engaged position along the shaft in which the plurality of splines of the sleeve intermeshed with the plurality of splines of both the input member and the intermediate member.

19. The transmission of claim 14, wherein
the input member comprises a concave end having a plurality of splines,
the intermediate member comprises a concave end having a plurality of splines, and
the direct drive clutch comprises a shaft having a base attached to the concave end of the input member and a distal end that extends into the concave end of the intermediate member, a sleeve slidable along the shaft, a spring to bias the sleeve toward the concave end of the input member, the sleeve comprising a plurality of splines intermeshed with the plurality of splines of the input member and a base end against which hydraulic fluid selectively forces the sleeve toward the concave end of the intermediate member to intermesh the plurality of splines of the intermediate member.

20. The transmission of claim 14, further comprising one or more synchronizers to selectively define a torque transfer path from the input member to the output member.

* * * * *